United States Patent
Clark et al.

(10) Patent No.: US 11,457,344 B2
(45) Date of Patent: Sep. 27, 2022

(54) MOBILE EAS ALARM RESPONSE PROXIMITY ENFORCEMENT USING WIRELESS TECHNOLOGIES

(71) Applicant: Sensormatic Electronics, LLC, Boca Raton, FL (US)

(72) Inventors: John J. Clark, Boynton Beach, FL (US); Adam S. Bergman, Boca Raton, FL (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 0 days.

(21) Appl. No.: 17/098,122

(22) Filed: Nov. 13, 2020

(65) Prior Publication Data
US 2021/0067939 A1 Mar. 4, 2021

Related U.S. Application Data

(63) Continuation of application No. 15/380,116, filed on Dec. 15, 2016, now abandoned.

(51) Int. Cl.
| | |
|---|---|
| *H04W 4/80* | (2018.01) |
| *G08B 13/24* | (2006.01) |
| *H04W 4/35* | (2018.01) |
| *H04W 4/33* | (2018.01) |

(52) U.S. Cl.
CPC .......... *H04W 4/80* (2018.02); *G08B 13/246* (2013.01); *G08B 13/2454* (2013.01); *H04W 4/33* (2018.02); *H04W 4/35* (2018.02)

(58) Field of Classification Search
CPC .......... H04W 4/80; H04W 4/35; H04W 4/33; G08B 13/2454
See application file for complete search history.

(56) References Cited

U.S. PATENT DOCUMENTS

| | | | | |
|---|---|---|---|---|
| 2009/0174544 | A1* | 7/2009 | Allen | G08B 29/26 340/10.3 |
| 2014/0126010 | A1* | 5/2014 | Rocas | G06F 3/01 358/1.15 |
| 2014/0351098 | A1* | 11/2014 | Shafer | G06Q 10/087 705/28 |

* cited by examiner

*Primary Examiner* — James J Yang
(74) *Attorney, Agent, or Firm* — ArentFox Schiff LLP

(57) ABSTRACT

Systems and methods for responding to an Electronic Article Surveillance ("EAS") alarm's issuance. The methods involve: receiving, by a mobile device, a short range communication signal from a fixed device located in proximity to EAS equipment issuing the EAS alarm; automatically transitioning an operational mode of the mobile device from a first operational mode in which alarm response functions are disabled to a second operational mode in which alarm response functions are enabled, in response to the short range communication signal's reception; receiving, by the mobile device, a user input for inputting a reason code specifying a reason for the EAS alarm's issuance; and communicating the reason code from the mobile device to an external device for causing a deactivation of the EAS alarm's issuance.

2 Claims, 6 Drawing Sheets

MOBILE EAS ALARM RESPONSE PROXIMITY ENFORCEMENT USING WIRELESS TECHNOLOGIES

CROSS-REFERENCE TO RELATED APPLICATIONS

This application claims priority to U.S. Non-Provisional application Ser. No. 15/380,116, titled "Mobile EAS Alarm Response Proximity Enforcement Using Wireless Technologies," filed on Dec. 15, 2016, the entire contents of which are hereby incorporated by reference herein.

BACKGROUND

Statement of the Technical Field

The present disclosure concerns generally to Electronic Article Surveillance ("EAS") detection systems. More particularly, the present invention relates to implementing systems and methods for mobile EAS alarm response proximity enforcement using wireless technologies.

Description of the Related Art

A typical EAS system in a retail setting may comprise a monitoring system and at least one security tag or label attached to an article to be protected from unauthorized removal. The monitoring system establishes a surveillance zone in which the presence of security tags and/or labels can be detected. The surveillance zone is usually established at an access point for the controlled area (e.g., adjacent to a retail store entrance and/or exit). If an article is authorized for removal from the controlled area, then the security tag and/or label thereof can be deactivated and/or detached therefrom. Consequently, the article can be carried through the surveillance zone without being detected by the monitoring system and/or without triggering the alarm.

In contrast, if an article enters the surveillance zone with an active security tag and/or label, then an alarm may be triggered to indicate possible unauthorized removal thereof from the controlled area. In order to deactivate the alarm issuance, an employee is required to enter a reason code for the alarm event into a wall mount responder unit located in proximity to the respective EAS surveillance zone. One possible reason for an alarm event is theft or EAS tag deactivation failure at Point-Of-Sale ("POS"). Such a wall mount responder unit is placed at each EAS surveillance zone of the retail facility, and electrically connected to a device manager. One can appreciate that such a wall mount responder configuration is expensive to implement and maintain, as well as being resource intensive.

SUMMARY

The present invention concerns implementing systems and methods for responding to EAS alarm's issuance resulting from a detection of an active EAS security tag's presence in a surveillance zone. The methods comprise receiving, by a mobile device (e.g., a smart phone), a short range communication signal from a fixed device (e.g., beacon) located in proximity to EAS equipment issuing the EAS alarm. In response to the short range communication signal's reception, the mobile device automatically transitions its operational mode from a first operational mode in which alarm response functions are disabled to a second operational mode in which alarm response functions are enabled. Thereafter, the mobile device receives a user input for inputting a reason code specifying a reason for the EAS alarm's issuance. The reason code can include, but is not limited to, a recovery code, a failed-to-deactivate code, an incoming item code, a system test code, an unattended code, an unexplained code, a tag-in area code, a runaway code, or a stock movement code. The reason code is communicated from the mobile device to an external device (e.g., a device manager or server) for causing a deactivation of the EAS alarm's issuance. Other information may also be communicated along with the reason code. For example, one or more of the following items is communicated from the mobile device to the external device along with the reason code: a unique identifier of the fixed device; a unique identifier of the mobile device; a unique identifier of a user of the mobile device; at least one scanned product barcode; a scanned receipt barcode; and a timestamp. The mobile device's operational mode is automatically transitioned back to the first operational mode when the mobile device moves out of range of the fixed device.

In some scenarios, a user of the mobile device is automatically prompted to indicate at least one detail associated with human activities associated with the EAS alarm's issuance, in response to the reason code. Additionally or alternatively, the mobile device's voice or sound detection and recognition operations are automatically initiated or enabled in response to the reason code. The voice or sound detection and recognition operations of the mobile device are performed to determine if a certain word was spoken or a certain sound was made in proximity to the mobile device that should trigger a remedial action. The remedial action can include, but is not limited to, notifying security personnel or notifying emergency personnel.

BRIEF DESCRIPTION OF THE DRAWINGS

Embodiments will be described with reference to the following drawing figures, in which like numerals represent like items throughout the figures.

DETAILED DESCRIPTION

Figure 1:
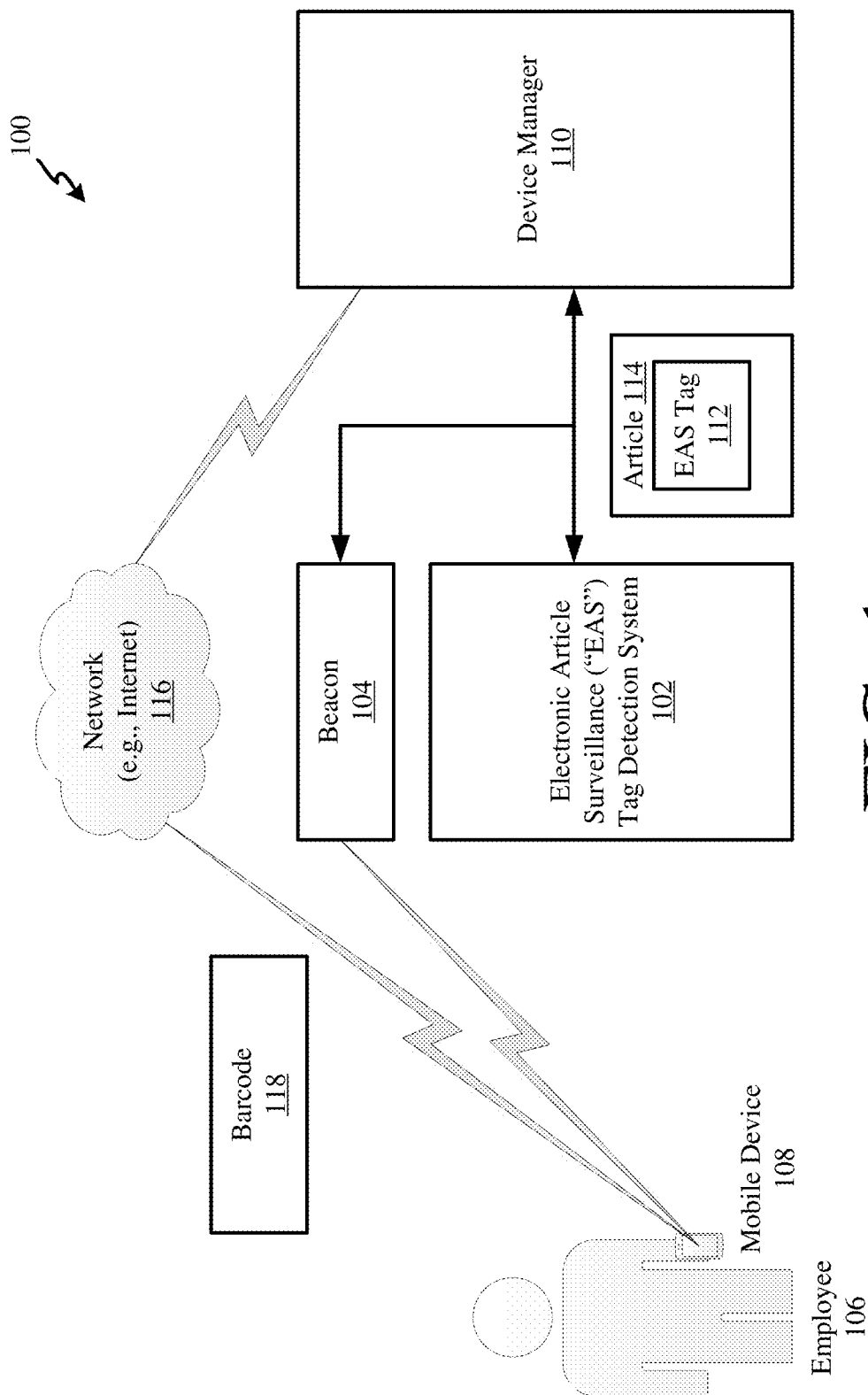
FIG. 1 is an illustration of an exemplary EAS system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Notably, EAS alarm responses are logged by conventional EAS systems. Typically, this EAS alarm response logging is done using an input device located at the doorway where the EAS alarm is detected. This conventional solution forces the employee to physically go to an input device located at the EAS alarm location to acknowledge the EAS alarm, approach the customer and enter information about the reason of the EAS alarm. Because the employee needs to go physically to the input device, the response time can be measured and recorded. However, with the proliferation of mobile devices, it can be attractive to the retailer for the EAS alarm response functionality to be done using a mobile application. The issue with this approach is that the person responding to the alarm may not be in proximity of the doorway where the EAS alarm occurred, but respond to the alarm anyway providing incorrect response time and data about the EAS alarm.

The present solution addresses this issue. Accordingly, the present solution provides implementing systems and methods which involve using a mobile application for EAS alarm response. The mobile application provides retailers with a way to enforce a rule that any employee acknowledging and responding to the EAS alarm must be in close proximity of the location where the EAS alarm occurred. By placing Short Range Communication ("SRC") technology (e.g., beacon technology and/or barcode technology) at the location near the EAS detection antennas (e.g., at a doorway), the responder must physically go to the location of the EAS alarm. The mobile application will detect the beacon/barcode and enable the responder to acknowledge the EAS alarm only when the mobile device is in close proximity of the beacon/barcode. This forces the responder to physically be in close proximity to acknowledge the alarm, record the correct response time, approach the customer and enter the correct reason for the EAS alarm.

The present solution is described herein in relation to beacon technology. The present solution is not limited in this regard. Other SRC technology can be employed in addition to or as an alternative to the beacon technology. For example, barcode technology can be employed. In this case, a barcode is placed in close proximity to a EAS equipment issuing the alarm. The responder must physically go to the location of the barcode and scan the same in order to enable EAS alarm functionalities thereof. The EAS alarm functionalities of the responder are automatically disabled after its reception of a response code and/or an expiration of a pre-defined time period (e.g., 5 minutes from the time of the barcode scan).

Referring now to FIG. 1, there is provided an illustration of an exemplary EAS system 100. The EAS system 100 is described herein in relation to a retail setting. The present solution is not limited in this regard. The present solution can be used in other non-retail related settings (e.g., inventory settings).

The EAS system 100 in the retail setting comprises an EAS tag detection system 102, a beacon 104, a device manager 110, and an EAS security tag 112 attached to an article 114 to be protected from unauthorized removal. The EAS tag detection system 102 establishes a surveillance zone in which the presence of the EAS security tag 112 can be detected. The surveillance zone will be discussed in detail below. The surveillance zone is usually established at an access point for the controlled area (e.g., adjacent to a retail store entrance and/or exit). If the article 114 is authorized for removal from the controlled area, then the EAS security tag 112 thereof can be deactivated and/or detached therefrom. Consequently, the article 114 can be carried through the surveillance zone without being detected by the EAS tag detection system 102 and/or without triggering the alarm.

In contrast, if the article 114 enters the surveillance zone with the EAS security tag 112 activated, then an alarm may be triggered to indicate possible unauthorized removal thereof from the controlled area. In order to deactivate the alarm issuance, an employee 106 is required to enter a reason code for the alarm event into a device manager 110. The reason code is entered using a mobile device 108 in the possession of the employee 106. The mobile device 108 can include, but is not limited to, a smart phone, a personal digital assistant, a personal computer, a laptop computer, or other mobile computing device. The mobile device 108 will be described in detail below.

The device manager 110 is remote from the EAS tag detection system 102. In response to the reason code, the device manager 110 can automatically perform operations to: (a) deactivate alarm issuance; (b) log information specifying the employee's identification, the mobile device's identification, the reason code and a time at which the reason code was entered by the employee; and/or (c) initiate certain operations of the mobile device 108 as described below (e.g., for enabling an audio detection functionality and/or security personnel notification functionality). In this regard, the device manager 110 is communicatively coupled to the EAS tag detection system 102 via a wired or wireless communications link.

There is a plurality of reason codes that can be entered by the employee 106. These reason codes can include, but are not limited to, a recovery code, a failed-to-deactivate code, a related-to-last code, an incoming item code, a system test code, an unattended code, an unexplained code, a tag-in-area code, a runaway code, and/or a stock movement code. The recovery code indicates that the EAS alarm resulted in the recovery of products that may have been stolen. The failed-to-deactivate code indicates that the EAS security tag failed to be deactivated during a previous tag deactivation process. The related-to-last code indicates that the EAS alarm issuance is related to a previous EAS alarm issuance. The incoming item code indicates that the active EAS alarm is attached to an item entering the facility rather than leaving the facility. The system test code indicates that the EAS alarm issuance was part of a system test. The unattended code indicates that cause for the EAS alarm issuance was not dealt with by the proper personnel. The unexplained code indicates that the reason for the EAS alarm issuance is unexplained or unknown. The tag-in-area code indicates that an active EAS tag is or was in relatively close proximity to the EAS tag detection system, but not necessarily in the surveillance zone. The runaway code indicates that there is a possible theft. The stock movement code indicates that the EAS alarm issuance is a result of the movement of stock within the facility. The device manager 110 can perform the same or different operations in response to each of the listed reason codes.

As shown in FIG. 1, a beacon 104 is also provided in system 100. The beacon has a fixed location with the facility. The beacon range is selected so that the employee 106 is forced to come within a desired distance from the EAS tag detection system in order for the mobile device's 108 alarm response functionalities to be enabled. For example, the beacon's range can be selected to be less than and/or equal to twenty feet. The present solution is not limited to these exemplary range(s). The present solution is also not limited to beacon applications. In this regard, other SRC devices can be used in addition to or as an alternative to the beacon(s). SRC devices are well known in the art, and therefore will not be described herein. Any known or to be known SRC device can be used herein without limitation.

Beacons are well known in the art, and therefore will not be described in detail herein. Any known or to be known beacon can be used herein without limitation. In some scenarios, the beacon 104 comprises an iBeacon®. An iBeacon® employs Bluetooth communication technology to connect to mobile communication devices (e.g., mobile device 108). The Bluetooth communication technology is one example of a SRC technology. Wi-Fi®, Zigbee®, WiMax® and a Near Field Communication ("NFC") are also examples of SRC technology. Upon establishment of such connection, the iBeacon® sends information to the mobile communication device. The information includes, but is not limited to, a unique identifier for the iBeacon® and/or location at which the iBeacon® is disposed. The Bluetooth communication technology is based on a 2.45 GHz transmission, and its data rate ranges from 1 Mbit to 24 Mbit.

The beacon 104 is also provided to ensure that the employee 106 is in proximity to the EAS tag detection system 102 when the reason code is entered into the device manager 110 thereby. In this regard, alarm response functionalities of the mobile device 108 are enabled when the mobile device 108 detects a beacon signal emitted from beacon 104 and/or becomes paired with the fixed beacon. This forces the employee 106 to be in relatively close proximity to the EAS tag detection system 102 when acknowledging an alarm. This close proximity of the employee to the EAS tag detection system 102 ensures that the correct reason code is entered into the device manager 110 and appropriate measures are taken to address the particular circumstances surrounding an alarm issuance. The reason code can include, but is not limited to, a sequence of numbers, letters, symbols or a combination thereof.

As noted above, the present solution is not limited to beacon scenarios. Additionally or alternatively, barcode technology can be employed. In this case, a barcode 118 is placed in close proximity to the EAS tag detection system 102 issuing the alarm. The mobile device 108 must physically go to the location of the barcode 118 and scan the same in order to enable EAS alarm functionalities thereof. The EAS alarm functionalities of the mobile device 108 are automatically disabled after its reception of a response code and/or an expiration of a pre-defined time period (e.g., 5 minutes from the time of the barcode scan).

Figure 2:
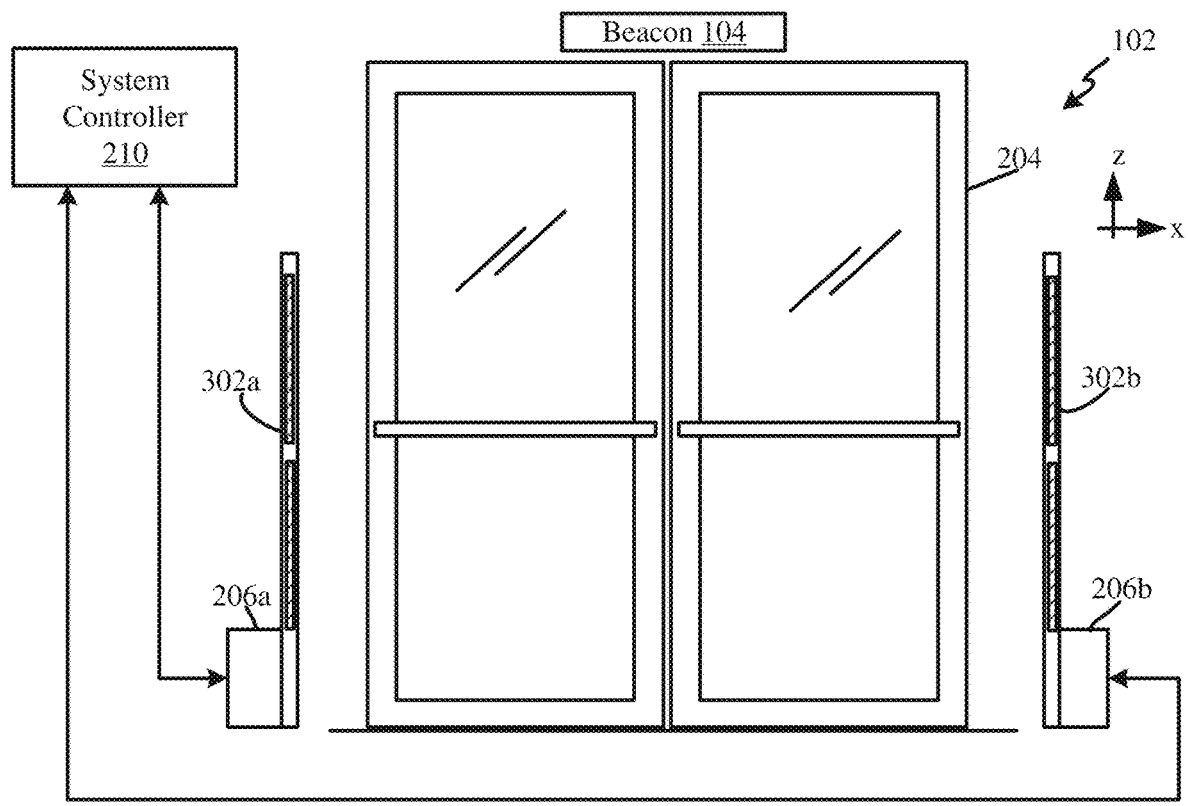
FIGS. 2 and 3 each provide an illustration of an exemplary architecture for the EAS tag detections system shown in FIG. 1.
Figure 3:
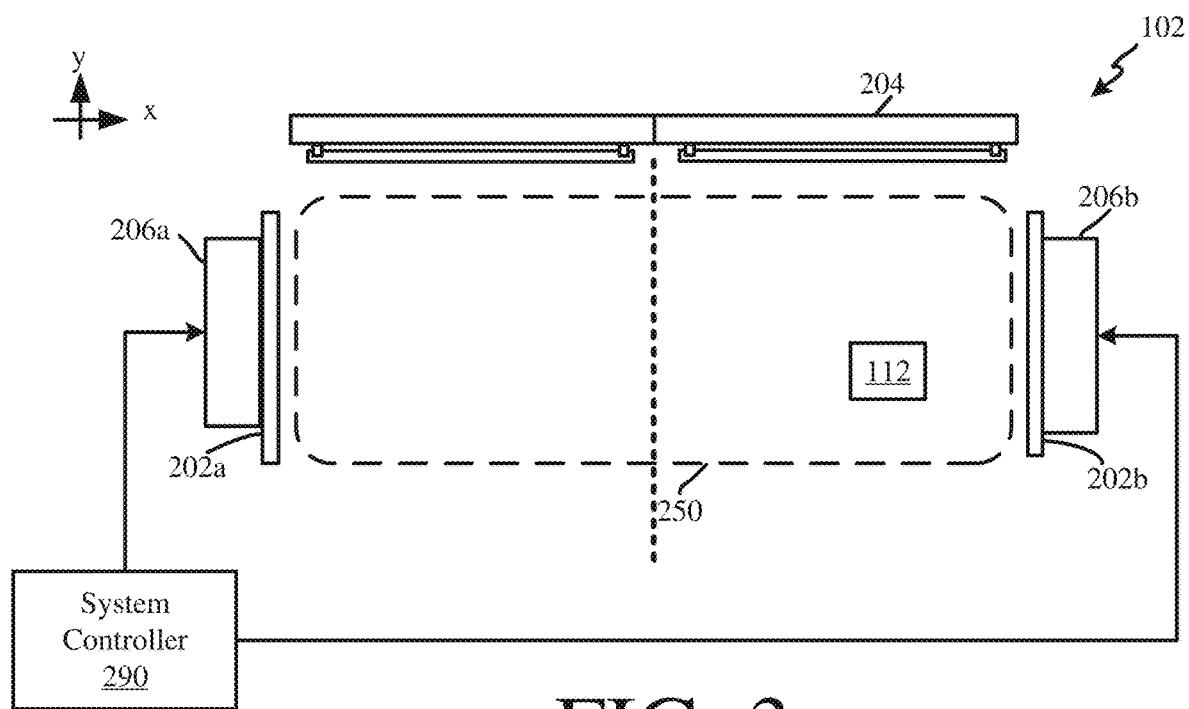

Referring now to FIGS. 2 and 3, an exemplary architecture for the EAS detection system 102 is provided. Notably, the present solution is described herein in terms of an AM EAS detection system. However, the method of the present solution can also be used in other types of EAS detection systems, including systems that use Radio Frequency ("RF") type tags and Radio Frequency IDentification ("RFID") EAS detection systems.

The EAS detection system 102 will be positioned at a location adjacent to an entry/exit 204 of a secured facility (e.g., a retail store). The EAS detection system 102 uses specially designed EAS security tags 112 which are applied to store merchandise or other items which are stored within a secured facility. The EAS security tags 112 can be deactivated or removed by authorized personnel at the secure facility. For example, in a retail environment, the EAS security tags 112 could be removed by store employees 106. When an active security tag 112 is detected by the EAS detection system 102 in an idealized representation of an EAS detection zone 250 near the entry/exit, the EAS detection system 102 will detect the presence of such security tag 112 and will sound an alarm or generate some other suitable EAS response, as described above. Accordingly, the EAS detection system 102 is arranged for detecting and preventing the unauthorized removal of articles or products from controlled areas.

The EAS detection system 102 includes a pair of pedestals 202a, 202b, which are located a known distance apart (e.g., at opposing sides of an entry/exit 204). The pedestals 202a, 202b are typically stabilized and supported by a base 206a, 206b. The pedestals 202a, 202b will each generally include one or more antennas that are suitable for aiding in the detection of the special EAS security tags, as described herein. For example, pedestal 202a can include at least one antenna 302 suitable for transmitting or producing an electromagnetic exciter signal field and receiving response signals generated by security tags in the EAS detection zone 250. In some scenarios, the same antenna can be used for both receive and transmit functions. Similarly, pedestal 202b can include at least one antenna 502 suitable for transmitting or producing an electromagnetic exciter signal field and receiving response signals generated by security tags in the EAS detection zone 250. The antennas provided in pedestals 202a, 202b can be conventional conductive wire coil or loop designs as are commonly used in AM type EAS pedestals.

These antennas will sometimes be referred to herein as exciter coils. In some scenarios, a single antenna can be used in each pedestal. The single antenna is selectively coupled to the EAS receiver. The EAS transmitter is operated in a time multiplexed manner. However, it can be advantageous to include two antennas (or exciter coils) in each pedestal as shown in FIG. 2, with an upper antenna positioned above a lower antenna.

The antennas located in the pedestals 202a, 202b are electrically coupled to a system controller 290. The system controller 290 controls the operation of the EAS detection system 102 to perform EAS functions as described herein. The system controller 290 can be located within a base 206a, 206b of one of the pedestals 202a, 202b or can be located within a separate chassis at a location nearby to the pedestals. For example, the system controller 290 can be located in a ceiling just above or adjacent to the pedestals 202a, 202b.

As noted above, the EAS detection system comprises an AM type EAS detection system. As such, each antenna is used to generate an Electro-Magnetic ("EM") field which serves as a security tag exciter signal. The security tag exciter signal causes a mechanical oscillation of a strip (e.g., a strip formed of a magnetostrictive or ferromagnetic amorphous metal) contained in a security tag within an EAS detection zone 250. As a result of the stimulus signal, the security tag will resonate and mechanically vibrate due to the effects of magnetostriction. This vibration will continue for a brief time after the stimulus signal is terminated. The vibration of the strip causes variations in its magnetic field, which can induce an AC signal in the receiver antenna. This induced signal is used to indicate a presence of the strip within the EAS detection zone 250. As noted above, the same antenna contained in a pedestal 202a, 202b can serve as both the transmit antenna and the receive antenna. Accordingly, the antennas in each of the pedestals 202a, 202b can be used in several different modes to detect a security tag exciter signal.

Figure 4:
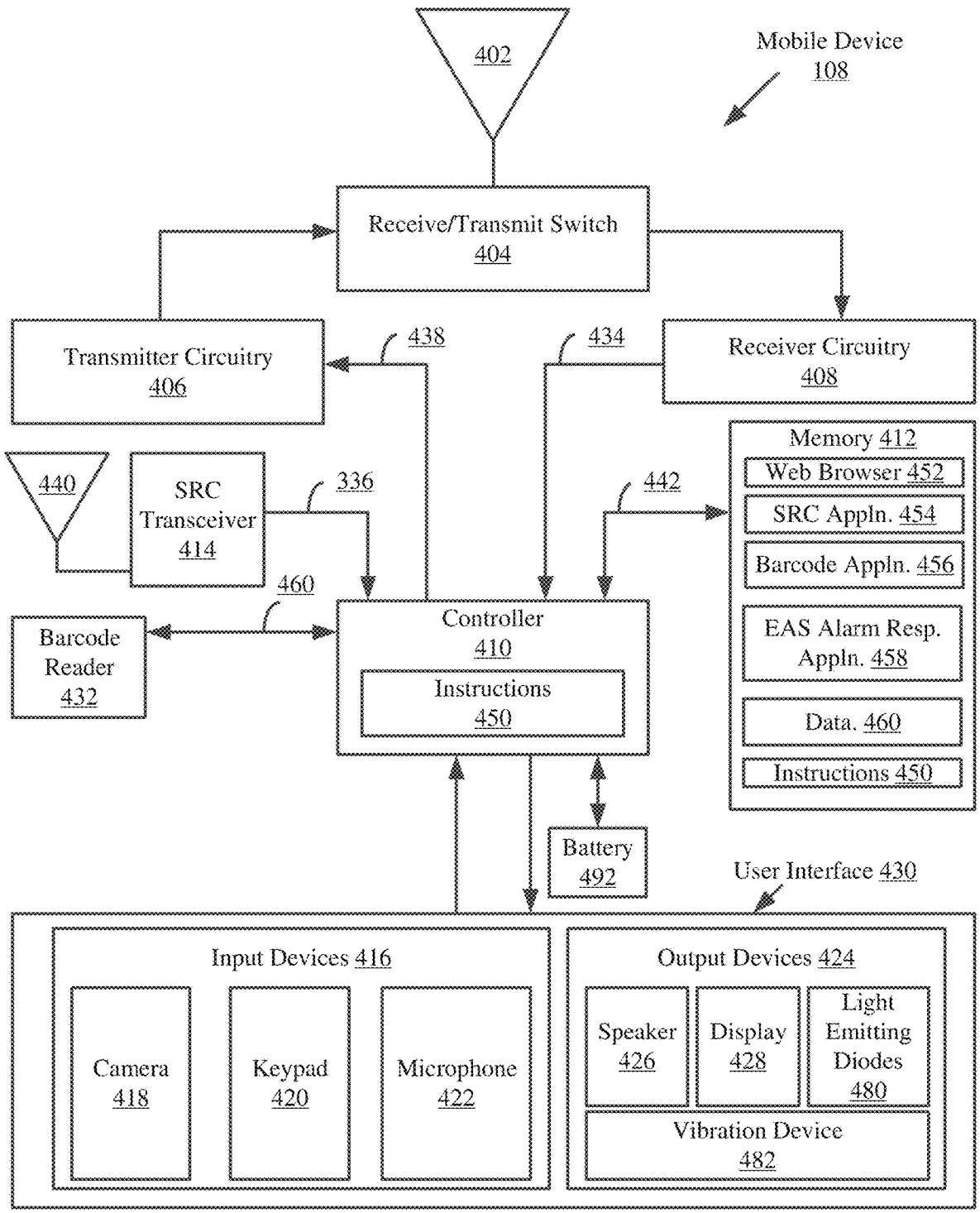
FIG. 4 is a schematic illustration of an exemplary architecture for the mobile device shown in FIG. 1.

Referring now to FIG. 4, there is provided an illustration of an exemplary architecture for a mobile device 108. Mobile device 108 may include more or less components than those shown in FIG. 4. However, the components shown are sufficient to disclose an illustrative embodiment implementing the present invention. Some or all of the components of the mobile device 108 can be implemented in hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As noted above, the mobile device 108 can include, but is not limited to, a notebook computer, a personal digital assistant, a cellular phone or a mobile phone with smart device functionality (e.g., a Smartphone). In this regard, the mobile device 108 comprises an antenna 402 for receiving and transmitting Radio Frequency ("RF") signals. A receive/transmit ("Rx/Tx") switch 404 selectively couples the antenna 402 to the transmitter circuitry 406 and the receiver circuitry 408 in a manner familiar to those skilled in the art. The receiver circuitry 408 demodulates and decodes the RF signals received from an external device. The receiver circuitry 408 is coupled to a controller (or microprocessor) 410 via an electrical connection 434. The receiver circuitry 408 provides the decoded signal information to the controller 410. The controller 410 uses the decoded RF signal information in accordance with the function(s) of the mobile device 108. The controller 410 also provides information to the transmitter circuitry 406 for encoding and modulating information into RF signals. Accordingly, the controller 410 is coupled to the transmitter circuitry 406 via an electrical connection 438. The transmitter circuitry 406 communicates the RF signals to the antenna 402 for transmission to an external device via the Rx/Tx switch 404.

The mobile device 108 also comprises an antenna 440 coupled to a Short Range Communications ("SRC") transceiver 414 for receiving SRC signals. SRC transceivers are well known in the art, and therefore will not be described in detail herein. However, it should be understood that the SRC transceiver 414 processes the SRC signals to extract information therefrom. The SRC transceiver 414 may process the SRC signals in a manner defined by the SRC application 454 installed on the mobile device 108. The SRC application 454 can include, but is not limited to, a Commercial Off the Shelf ("COTS") application (e.g., a Bluetooth application). The SRC transceiver 414 is coupled to the controller 410 via an electrical connection 436. The controller uses the extracted information in accordance with the function(s) of the mobile device 108. For example, the extracted information can include a unique identifier (e.g., identifying the beacon or a location at which the beacon is disposed) received from beacon 104 of FIGS. 1-2. The unique identifier can be used by the mobile device 108 to initiate or enable EAS alarm response functions thereof as described herein. The EAS alarm response functions are implemented via an EAS alarm response application 458.

The controller 410 may store received and extracted information in memory 412 of the mobile device 108. Accordingly, the memory 412 is connected to and accessible by the controller 410 through electrical connection 442. The memory 412 may be a volatile memory and/or a non-volatile memory. For example, memory 412 can include, but is not limited to, a Random Access Memory ("RAM"), a Dynamic RAM ("DRAM"), a Read Only Memory ("ROM") and a flash memory. The memory 412 may also comprise unsecure memory and/or secure memory. The memory 412 can be used to store various other types of data 460 therein, such as authentication information, cryptographic information, location information, and various work order related information.

The mobile device 108 also may comprise a barcode reader 432. Barcode readers are well known in the art, and therefore will not be described herein. However, it should be understood that the barcode reader 432 is generally configured to scan a barcode and process the scanned barcode to extract information therefrom. The barcode reader 432 may process the barcode in a manner defined by the barcode application 456 installed on the mobile device 108. Additionally, the barcode scanning application can use camera 418 to capture the barcode image for processing. The barcode application 456 can include, but is not limited to, a COTS application. The barcode reader 432 provides the extracted information to the controller 410. As such, the barcode reader 432 is coupled to the controller 410 via an electrical connection 460. The controller 410 uses the extracted information in accordance with the function(s) of the mobile device 108. For example, the extracted information can be used by mobile device 108 to enable EAS response functionalities thereof and/or obtain security information which is to be provided to a network node.

As shown in FIG. 4, one or more sets of instructions 450 are stored in memory 412. The instructions may include customizable instructions and non-customizable instructions. The instructions 450 can also reside, completely or at least partially, within the controller 410 during execution thereof by mobile device 108. In this regard, the memory 412 and the controller 410 can constitute machine-readable media. The term "machine-readable media", as used herein, refers to a single medium or multiple media that stores one or more sets of instructions 450. The term "machine-readable media", as used here, also refers to any medium that is capable of storing, encoding or carrying the set of instructions 450 for execution by the mobile device 108 and that causes the mobile device 108 to perform one or more of the methodologies of the present disclosure.

The controller 410 is also connected to a user interface 430. The user interface 430 comprises input devices 416, output devices 424 and software routines (not shown in FIG. 4) configured to allow a user to interact with and control software applications (e.g., software applications 452-458 and other software applications) installed on the mobile device 108. Such input and output devices may include, but are not limited to, a display 428, a speaker 426, a keypad 420, a directional pad (not shown in FIG. 4), a directional knob (not shown in FIG. 4), a microphone 422, and a camera 418. The display 428 may be designed to accept touch screen inputs. As such, user interface 430 can facilitate a user software interaction for launching applications (e.g., software applications 452-458 and other software applications) installed on the mobile device 108. The user interface 430 can facilitate a user-software interactive session for: initiating communications with an external device; writing data to and reading data from memory 412; and/or initiating EAS alarm response processes for acknowledging an EAS alarm, entering a reason code for the alarm and/or initiating customer service or security measures responsive to the reason specified by the reason code.

The display 428, keypad 420, directional pad (not shown in FIG. 4) and directional knob (not shown in FIG. 4) can collectively provide a user with a means to initiate one or more software applications or functions of the mobile device 108. The application software 452-458 can facilitate the data exchange (a) a user and the mobile device 108, (b) the mobile device 108 and a beacon 104 via an SRC, and/or (c) the mobile device 108 and a device manager 110 via a non-SRC (e.g., via public network 116 communications). In this regard, the application software 452-458 performs one or more of the following: verify the identity of a user of mobile device 108 via an authentication process; present information to the user indicating this his/her identity has or has not been verified; present a Graphical User Interface ("GUI") to the user for enabling the user to enter reason codes for EAS alarms.

Figure 5:
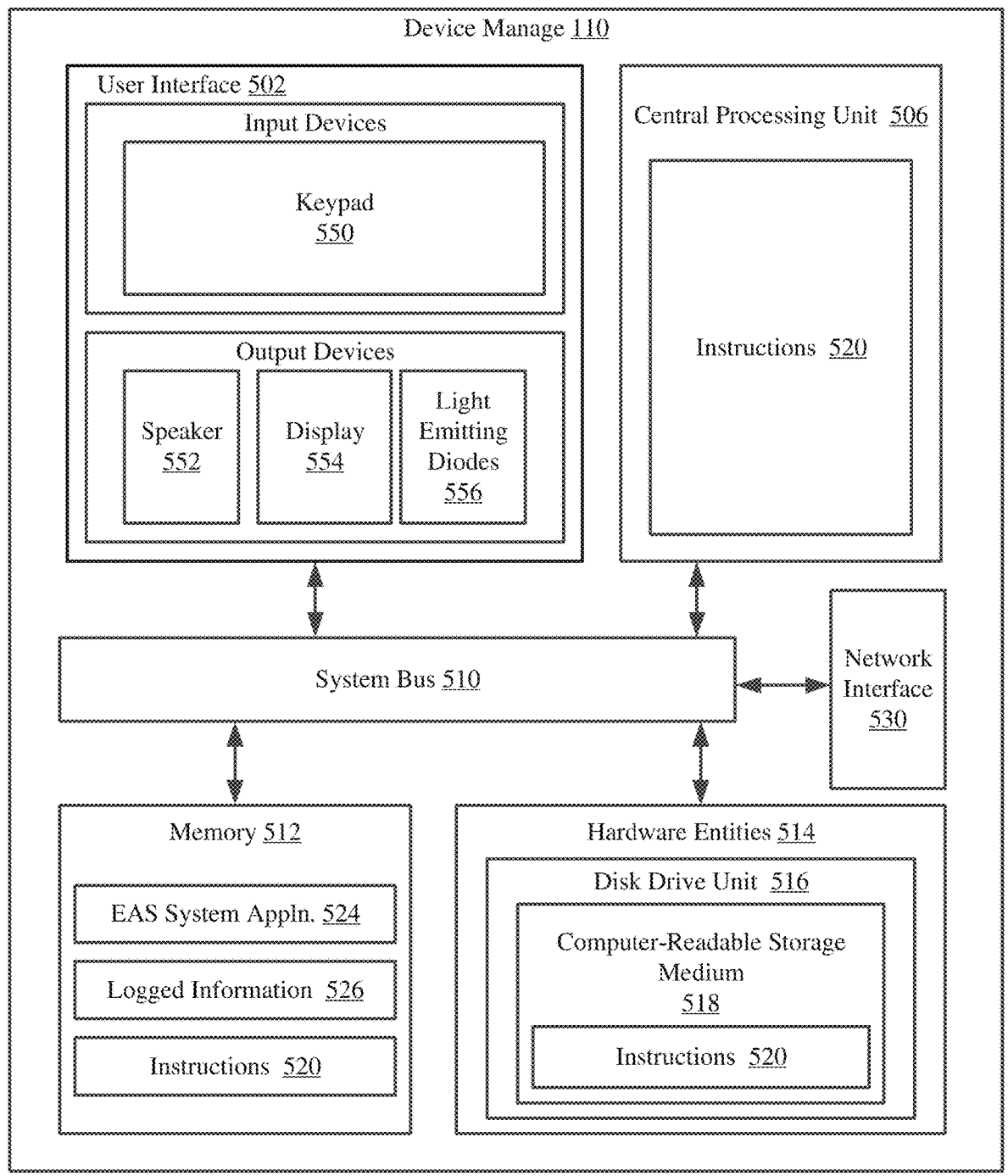
FIG. 5 is a schematic illustration of an exemplary architecture for the device manager shown in FIG. 1.

Referring now to FIG. 5, there is provided a detailed block diagram of an exemplary architecture for the device manager 110. Notably, the device manager 110 may include more or less components than those shown in FIG. 5. However, the components shown are sufficient to disclose an illustrative embodiment implementing the present solution. The hardware architecture of FIG. 35 represents one embodiment of a representative device manager 110 configured to facilitate the provision of EAS alarm response functions within a retail store facility. As such, the device manager 110 of FIG. 5 implements at least a portion of a method for providing such EAS alarm response functions as discussed herein. Some or all the components of the device manager 110 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 5, the device manager 110 comprises a user interface 502, a Central Processing Unit ("CPU") 506, a system bus 510, a memory 512 connected to and accessible by other portions of device manager 110 through system bus 510, and hardware entities 514 connected to system bus 510. The user interface can include input devices (e.g., a keypad 550) and output devices (e.g., speaker 552, a display 554, and/or light emitting diodes 556), which facilitate user-software interactions for controlling operations of the device manager 110.

At least some of the hardware entities 514 perform actions involving access to and use of memory 512, which can be a Random Access Memory ("RAM"), a disk driver and/or a Compact Disc Read Only Memory ("CD-ROM"). Hardware entities 514 can include a disk drive unit 516 comprising a computer-readable storage medium 518 on which is stored one or more sets of instructions 520 (e.g., software code) configured to implement one or more of the methodologies, procedures, or functions described herein. The instructions 520 can also reside, completely or at least partially, within the memory 512 and/or within the CPU 506 during execution thereof by the device manager 110. The memory 512 and the CPU 506 also can constitute machine-readable media. The term "machine-readable media", as used here, refers to a single medium or multiple media (e.g., a centralized or distributed database, and/or associated caches and servers) that store the one or more sets of instructions 520. The term "machine-readable media", as used here, also refers to any medium that is capable of storing, encoding or carrying a set of instructions 520 for execution by the device manager 110 and that cause the device manager 110 to perform any one or more of the methodologies of the present disclosure.

In some scenarios, the hardware entities 514 include an electronic circuit (e.g., a processor) programmed for facilitating the provision of EAS alarm response functions and/or operations. In this regard, it should be understood that the electronic circuit can access and run an EAS system application 524 installed on the device manager 110. The software application 524 is generally operative to facilitate: the monitoring of the EAS system (e.g., including a plurality of EAS tag detection systems); and/or the performance of EAS alarm response related operations. Other functions of the software application 524 will become apparent as the discussion progresses.

The device manager 110 also comprises a network interface 530. The network interface 530 facilitates communications with remote devices via a network 116. The network 116 can include, but is not limited to, the Internet, an Intranet, and/or a cellular network.

Figure 6A:
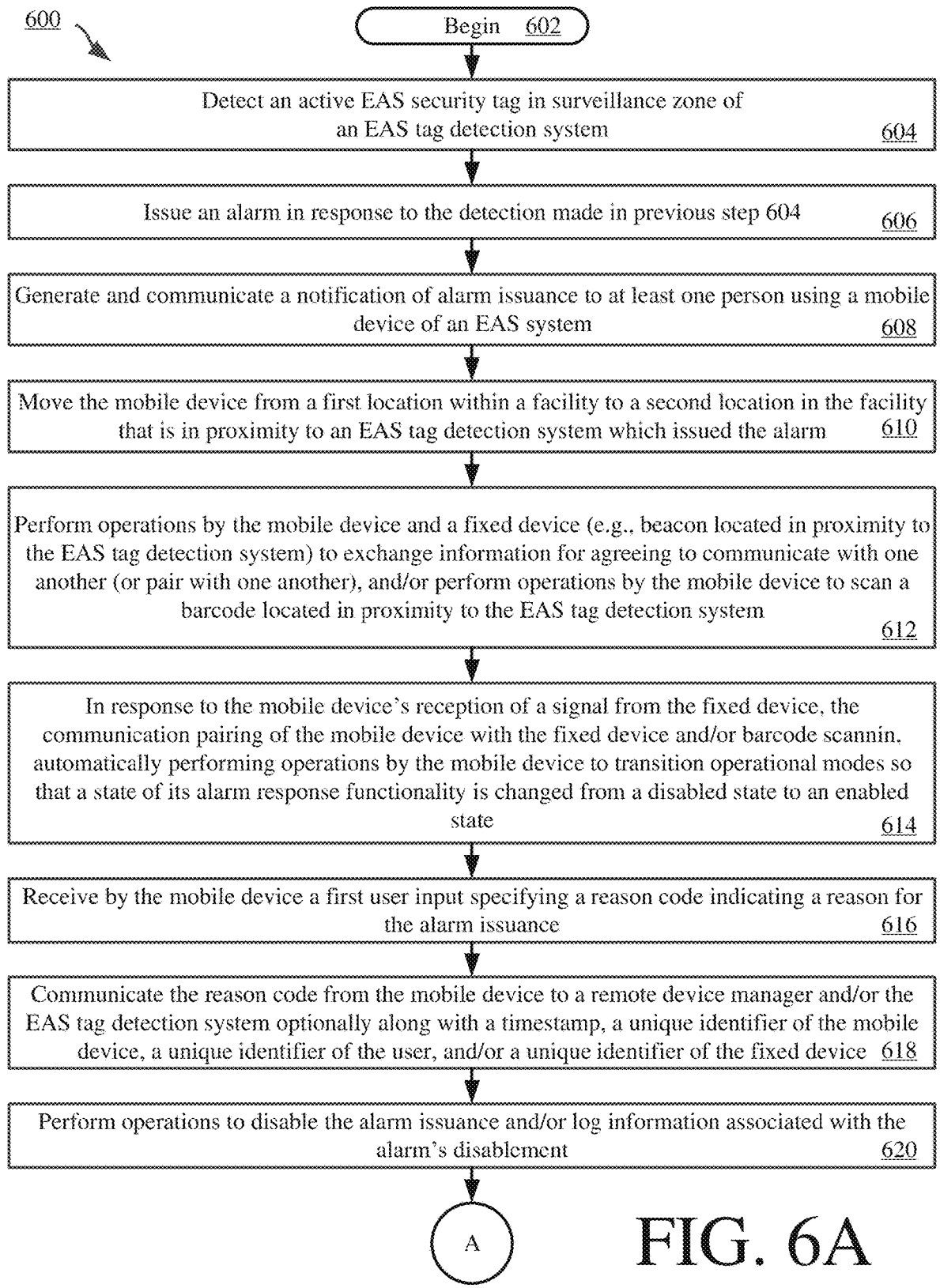
FIGS. 6A-6B (collectively referred to as "FIG. 6") provide a flow diagram of an exemplary method for responding to an EAS alarm issuance as a result of an active EAS security tag's presence in a surveillance zone.
Figure 6B:
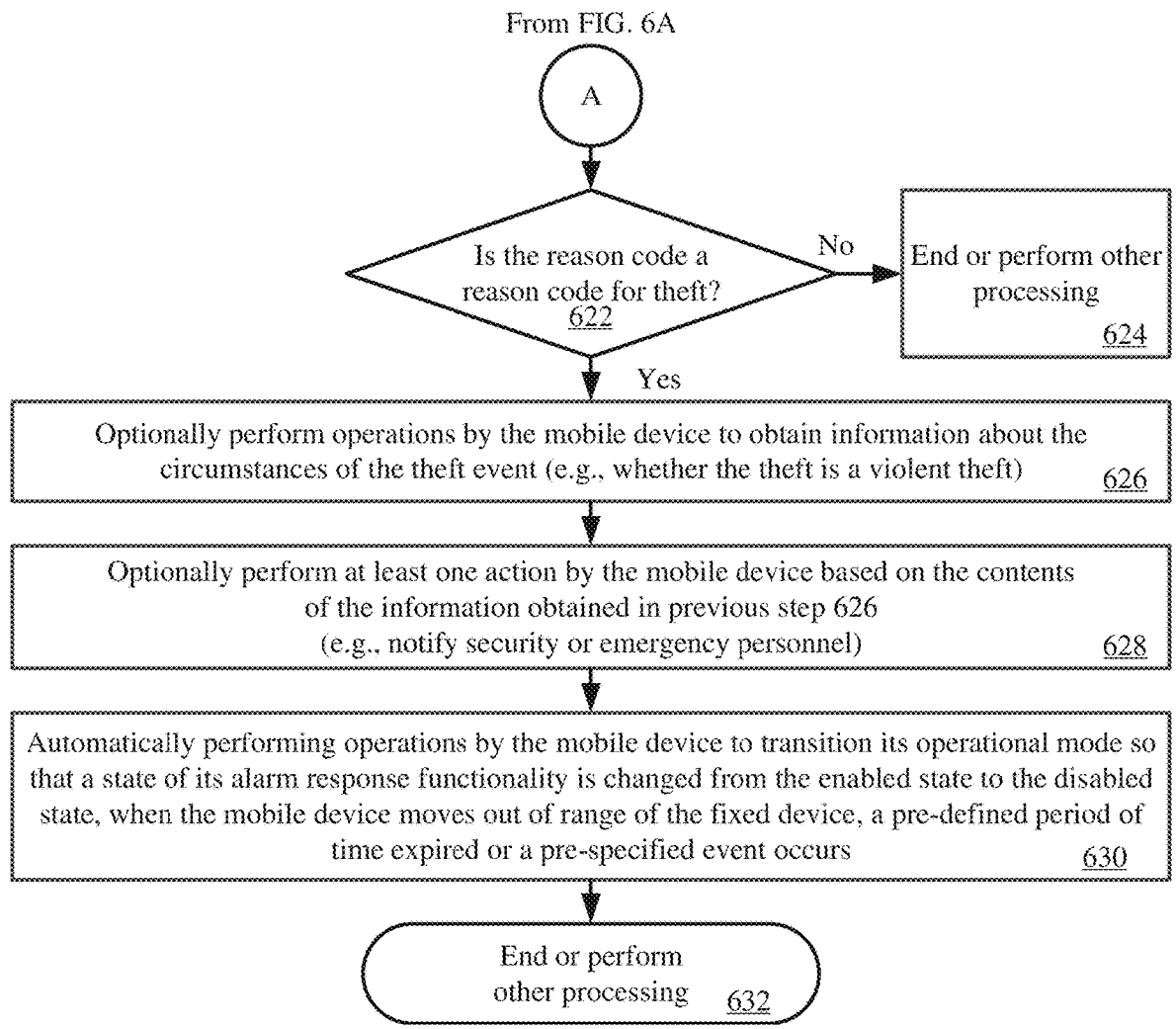

Referring now to FIG. 6, there is provided a flow diagram of an exemplary method 600 for responding to EAS alarms. Method 600 begins with 602 and continues with 604 where the presence of an active EAS security tag (e.g., EAS security tag 112 of FIG. 1) within a surveillance zone (e.g., EAS detection zone 250 of FIG. 3) is detected by an EAS tag detection system (e.g., EAS tag detection system 102 of FIG. 1). An alarm is issued in 606 as a response to the detection made in 604. Techniques for EAS alarm issuance are well known in the art. Any known or to be known technique for EAS alarm issuance can be used herein without limitation. For example, the EAS tag detection system 102 can output a visual alarm and/or an auditory alarm. Additionally or alternatively, a visual, tactile and/or auditory alarm is output from the EAS security tag.

At least one person (e.g., employee 106 of FIG. 1) is notified about the alarm issuance as shown by 608. The notification may be generated in the form of an electronic message sent to and displayed by a mobile device (e.g., mobile device 108 of FIG. 1) in the person's possession. The electronic message can include, but is not limited to, a text message, an email message or an application message. In some scenarios, the notification can also include information specifying: a type of an item to which the active EAS security tag is attached; the entrance/exit closest to where the active EAS security tag was detected; and/or a captured image showing the person or people that were passing through the surveillance zone when the active EAS security tag was detected.

When the person receives such a notification, (s)he travels towards the area of the facility where the alarm is being issued. Consequently, the mobile device is moved from a first location within the facility (e.g., a back office) to a second location in the facility that is in proximity to the EAS tag detection system that issued the alarm, as shown by 610. At the second location, the mobile device is in the range of a fixed device (e.g., beacon 104 of FIG. 1) and/or barcode (e.g., barcode 118 of FIG. 1) which is/are located in proximity to the EAS tag detection system. As such, the mobile device and the fixed device perform operations in 612 to exchange information for agreeing to communicate with one another (or pair with one another). This type of informational exchange is well known in the art, and therefore will not be described herein. Any known or to be known technique for establishing a communications link between two devices can be used herein without limitation. In some scenarios, a Bluetooth® pairing process is employed. The present solution is not limited to the device pairing configurations. In this regard, 612 can alternatively or additional involve scanning a barcode located in proximity to the EAS tag detection system.

In response to the mobile device's reception of a signal from the fixed device, the communication pairing of the mobile device with the fixed device and/or the barcode scanning, the mobile device automatically performs operations to transition operational modes so that a state of its alarm response functionality is changed from a disabled state to an enabled state, as shown by 614. The alarm response functionality allows a user of the mobile device to enter reason codes for alarm issuances, as well as take any remedial measures in response to the circumstances surrounding the alarm issuances. Accordingly in 616, the mobile device receives a first user input specifying a reason code indicating a reason for the alarm issuance. The reason code can include, but is not limited to, a recovery code, a failed-to-deactivate code, a related-to-last code, an incoming item code, a system test code, an unattended code, an unexplained code, a tag-in-area code, a runaway code, and/or a stock movement code.

The reason code is communicated in 618 from the mobile device to a remote device manager (e.g., device manager 110 of FIG. 1) and/or the EAS tag detection system. Other information may optionally be communicated from the mobile device along with the reason code. This other information can include, but is not limited to, at least one timestamp, a unique identifier of the mobile device, a unique identifier of the user, a unique identifier of the fixed device, at least one scanned product barcode, and/or a scanned receipt barcode. At the device manager and/or EAS tag detection system operations are performed in 620 to disable the alarm issuance and/or log information associated with the alarm's disablement. The logged information can include, but is not limited to, a time at which the mobile device received a short range communication signal from the fixed device (e.g., a time at which the operations of 612 were begun or performed), a time of alarm issuance, a time of alarm disablement, a reason code, a unique identifier of the mobile device, a unique identifier of the fixed device (e.g., beacon), a unique identifier of the person (e.g., employee), at least one barcode (e.g., a product barcode, a receipt barcode, or a EAS alarm responder barcode) and/or a time at which the reason code was entered into the system. Methods for disabling EAS alarm issuance are well known in the art, and therefore will not be described herein. Any known or to be known method for alarm issuance can be used herein without limitation.

Upon completing 620, method 600 continues with an optional decision as shown by 622. In 622, a decision is made as to whether or not the reason code is a reason code for theft. If not [622:NO], then method 600 ends or other processing is performed as shown by 624. In contrast, if the reason code is the reason code for theft [622:YES], then the mobile device optionally performs operations specified in 626 and 628. These operations can be performed at other times during the process 600. For example, the optional operations of 622-628 can be performed immediately or shortly after the time at which the mobile device receives the reason code from the user thereto.

The optional operations of 626 involve performing operations by the mobile device to obtain information about the circumstances of the theft event (e.g., whether the theft is a violent theft). The operations can include presenting a Graphical User Interface ("GUI") to the user including a prompt for certain information (e.g., an indication as to whether or not violence is occurring as a result of the theft). Alternatively or additionally, these operations can include: capturing an image or video of a surrounding environment and/or automatically activating audio detection functions and speech/sound recognition functions of the mobile device. For example, the mobile device can begin recording sound using at least one microphone thereof and processing audio signals including the recorded sound to detect certain words (e.g., help, stop, violence), phrases and/or sounds (e.g., gun shots, yelling, glass breaking) contained therein. Methods for speech/sound recognition are well known in the art, and therefore will not be described herein. Any known or to be known method for speech/sound recognition can be used herein without limitation. The sound recording and/or speech/sound recognition process can be performed for a pre-defined duration (e.g., 5 minutes starting from the time the reason code was input into the mobile device).

The optional operations of 628 involve performing at least one action by the mobile device based on the contents of the obtained information. For example, if the obtained information indicates that there is violence as a result of the theft, then the action can include, but is not limited to, notifying security personnel, notifying emergency personnel, placing a call to an emergency line, and/or capturing an image or video of a surrounding environment.

Upon completing 620 or optional 622-628, the mobile device automatically transitions its operational mode from the second operational mode in which alarm response functions are enabled to the first operational mode in which alarm response functions are disabled, when the mobile device moves out of range of the fixed device (as shown by 630), pre-defined period of time expires or a pre-specified event occurs (e.g., alarm acknowledgement). Subsequently, the method 600 ends or other processing is performed as shown by 632.

In view of the forgoing, the present solution uses beacon technology (that can be detected by a mobile device) to force a person to be in close physical proximity of where an EAS alarm has occurred in order to record the correct response time, acknowledge and respond to the EAS alarm when using a mobile application. The beacon may be mounted in close proximity of the EAS detection antennas which are normally located near a doorway in retail applications. Each beacon is programmed to uniquely identify the specific location. The mobile application monitors all or select EAS detection systems in the retail location for EAS alarm activity.

When an EAS alarm occurs, the mobile application notifies the person of the EAS alarm occurrence and the location of the EAS alarm. The acknowledgment and response functionality in the mobile application is disabled until the person using the mobile application is physically in close proximity of the correct beacon/barcode for the EAS alarm. Once the mobile device is in close proximity of the beacon/barcode, the acknowledgment and response functionality of the mobile device is enabled. The correct response time is recorded when acknowledged. Alternatively, the EAS alarm can be automatically acknowledged and the correct response time is recorded when proximity is detected. The person can then enter the proper response information about the EAS alarm into the mobile application.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A method for responding to an Electronic Article Surveillance ("EAS") alarm, comprising:
   disabling EAS alarm response functions of a mobile device;
   receiving, by the mobile device and after the disabling, a first EAS alarm of an EAS equipment;
   receiving, by the mobile device and after receiving the first EAS alarm, a short range communication (SRC) signal from a fixed device located in proximity to the EAS equipment issuing the first EAS alarm;
   enabling, in response to receiving the SRC signal, the disabled alarm response functions;
   receiving, by the mobile device via the enabled alarm response functions, a user input indicating a reason code specifying a reason for the first EAS alarm;
   determining whether the reason code is a certain reason code of a plurality of predetermined reason codes; and
   automatically activating operations of select input devices of the mobile device to obtain information about a surrounding environment in response to a determination that the reason code is the certain reason code.

2. The method of claim 1, wherein the plurality of predetermined reason codes excludes an unexplained false alarm.

* * * * *